June 2, 1936.  E. T. VINCENT  2,043,080

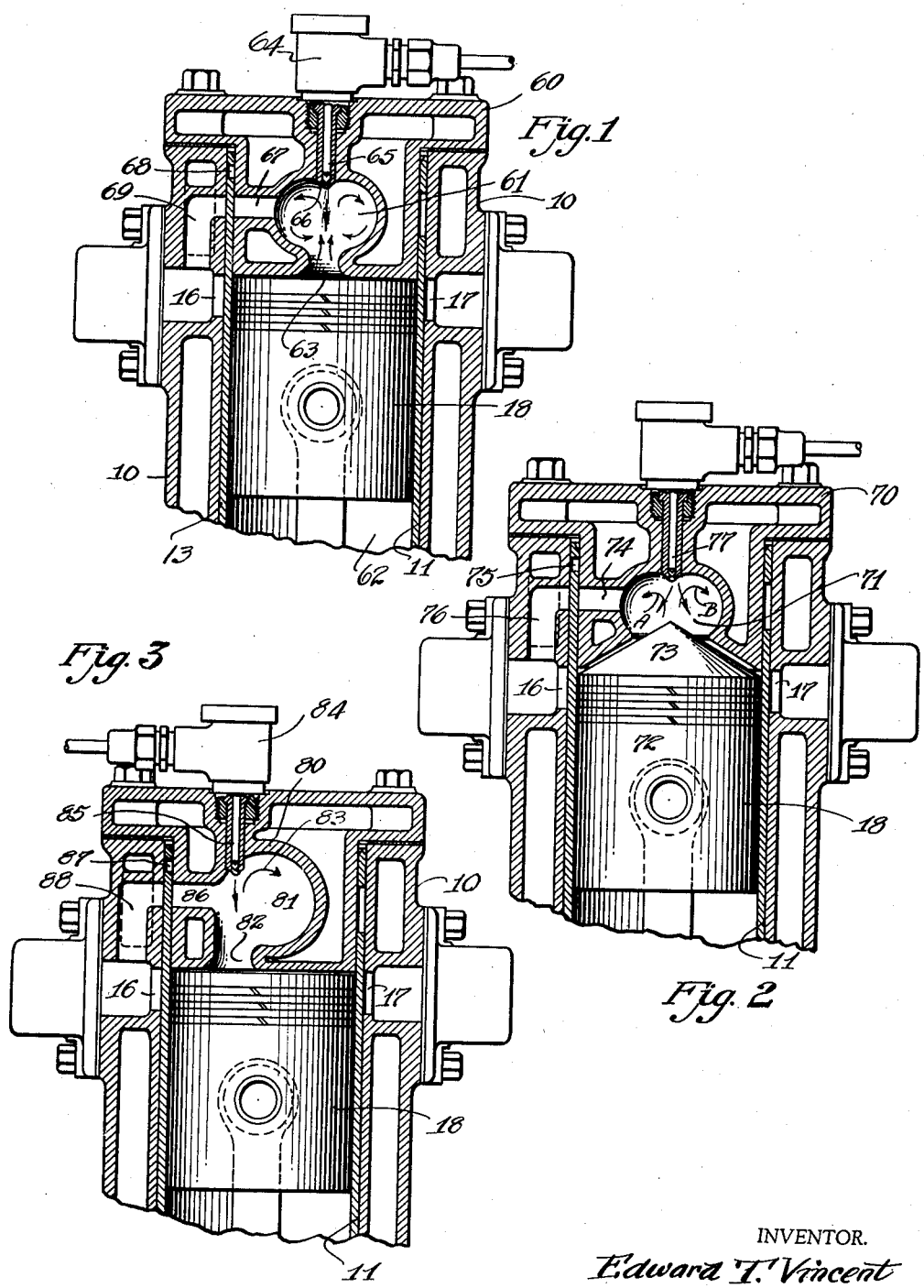

ENGINE

Filed Sept. 25, 1931  2 Sheets-Sheet 2

INVENTOR.
Edward T. Vincent
BY
ATTORNEY.

Patented June 2, 1936

2,043,080

UNITED STATES PATENT OFFICE 2,043,080

ENGINE

Edward T. Vincent, Detroit, Mich., assignor to Continental Motors Corporation, Detroit, Mich., a corporation of Virginia Application September 25, 1931, Serial No. 565,110

5 Claims. (Cl. 123—76)

My invention relates to engines and more particularly to engines of the sleeve valve fuel injection type.

Internal combustion engines of the fuel injection type employing sleeve valve control means provide in general an improved engine performance, may be economically operated, and are capable of producing relatively high maximum power output.

An object of my present invention is to construct a fuel injection engine of the sleeve valve type wherein maximum fuel economy and operating efficiency may be obtained by providing improved fuel combustion means and in particular by providing a combustion chamber facilitating combustion.

Figure 4:
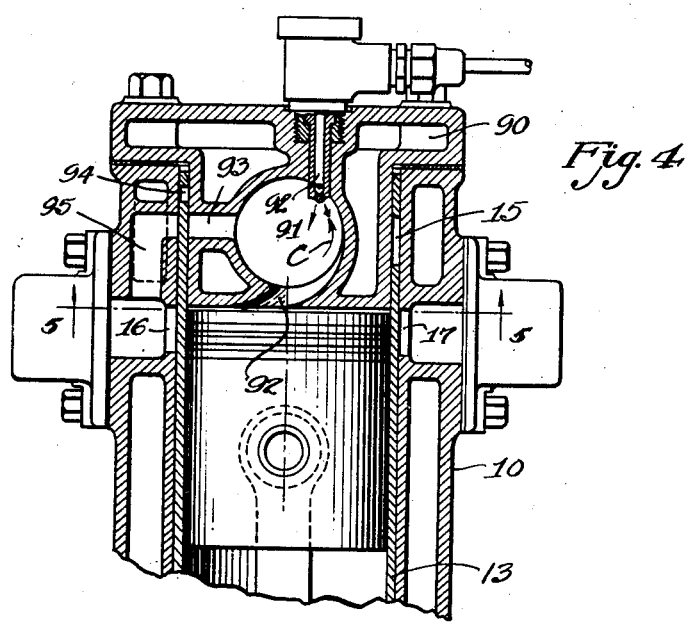
Figure 5:
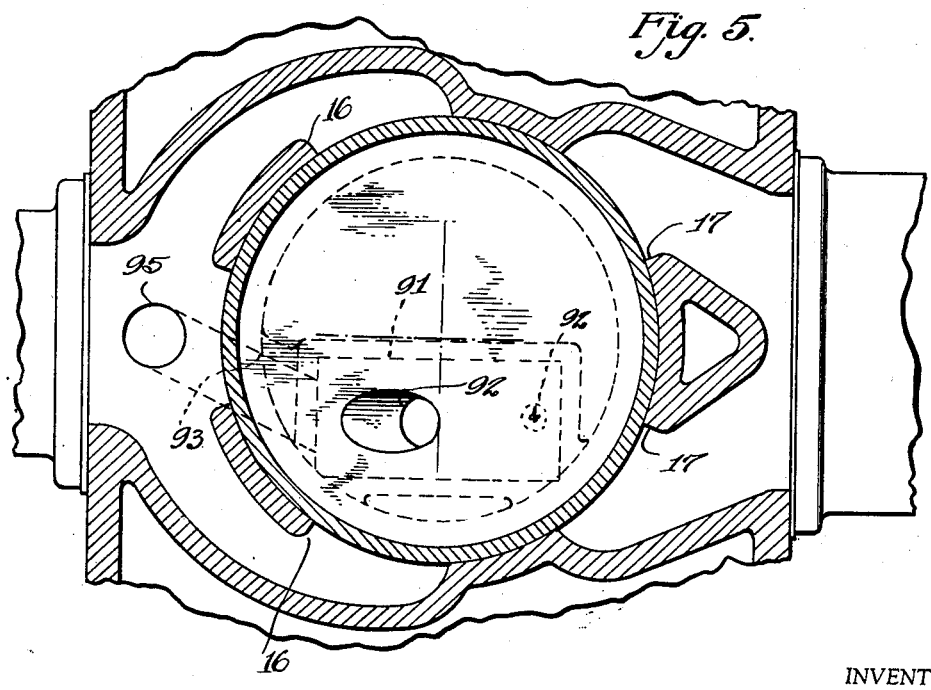

For a further understanding of my invention reference may be had to the accompanying drawings illustrating preferred embodiments of my invention and in which:

Fig. 1 is a vertical sectional view of a sleeve valve compression ignition engine embodying a cardioid of revolution combustion chamber and illustrating means for scavenging said combustion chamber, Fig. 2 is a modified construction of an engine somewhat similar to that illustrated by Fig. 1, Fig. 3 is still another modified form of construction employed with an engine as generally illustrated by Figs. 1 and 2, and illustrating scavenging means associated with a spherical combustion chamber, Fig. 4 is a vertical sectional view of a compression ignition sleeve valve engine embodying a substantially cylindrical combustion chamber having an axis extending substantially at right angles to the axis of the engine cylinder and in which a restricted opening is provided and which is preferably offset from the axis of the engine cylinder in order to utilize the effect of the air swirl for inducing a swirl in the cylindrical combustion chamber about its axis, and Fig. 5 is a plan sectional view taken on the line 5—5 of Fig. 4.

One of the advantages resulting from the employment of a sleeve valve engine in which the air is introduced through the side walls of the cylinder and controlled by the ported sleeve valves is that the cylinder head may be constructed without air intake ports and it is thus possible to provide any suitable contour to the bottom face of the cylinder head whereas in the poppet type engine in which the intake ports are provided in the head curved surfaces are not permissible.

In Figs. 1 to 5 inclusive I have illustrated a sleeve valve compression ignition engine embodying a cylinder head structure having a modified combustion chamber construction. In Fig. 1 I have particularly illustrated a cylinder head structure 60 provided with a combustion chamber 61 constructed as a cardioid of revolution and communicating with the cylinder 62 through a restricted opening 63 preferably arranged axially with the cylinder axis. The combustion chamber 61 is constructed so as to force the air into the combustion chamber at the end of the compression stroke and cause the air to pass through the restricted opening 63 which creates considerable turbulence within the combustion chamber in addition to retaining the swirling tendency initially introduced to the air. The shape of the chamber is such that it will induce secondary swirls therein in the direction as indicated by the arrows due to the action on the air as the same is caused to flow through the restricted opening 63. Fuel injection means 64 are provided and includes a fuel nozzle 65 preferably constructed co-axial with the cylinder and associated combustion chamber, this nozzle being provided preferably with a single jet 66 through which the fuel is sprayed against the air flow in the combustion chamber and completely atomized in the presence of the air and is ignited in the usual manner.

A scavenging inlet port 67 is provided in the cylinder head, communicating with the combustion chamber and controlled by the sleeve valve means. Said sleeve valve means is provided with an auxiliary intake port 68 cooperating with the cylinder head intake port 67 and the by-pass 69 in the engine structure for introducing air directly into the combustion chamber at a predetermined time. The purpose of this auxiliary air intake is to scavenge the combustion chamber after combustion so that no burned gases will be trapped within the combustion chamber during the intake and compression stroke which would tend to interfere with efficient engine operation.

In Fig. 2 I have provided an engine constructed in general similar to the structure illustrated in Fig. 1, and have provided a cylinder head structure 70 having a combustion chamber 71 constructed as a cardioid of revolution which in general is quite similar to that shown in Fig. 1. The difference between the structure shown in Fig. 2 and that shown in Fig. 1 is that the piston 72 is provided with a conical portion 73 adapted for partial projection in the combustion chamber

11 and arranged to cooperate with the conical shaped recessed bottom wall portion of the cylinder head 70 in such a way as to provide an air squirt directed into the combustion chamber for setting up a swirl in a plane substantially at right angles to the plane of the swirl initially induced to the air as the same is introduced into the cylinder. It will be noted that the air squirt provided by this construction is directed radially inwardly of the combustion chamber and tends to provide oppositely directed swirls in a vertical plane within the combustion chamber 71 as shown by arrows A and B. The fuel nozzle 77 is preferably arranged axially of the combustion chamber and associated cylinder and constructed to spray the fuel into the swirling air mixture in a direction inwardly of the cylinder.

In this construction the cylinder head is provided with an auxiliary air intake 74 and the sleeve valve means is provided with an intake port 75 which cooperates with the cylinder head intake port 74 and cylinder intake port 76 for scavenging the combustion chamber to remove the burned products of combustion from the combustion chamber 71 prior to the intake and compression strokes of the engine.

In Fig. 3 I have provided a cylinder head structure 80 having a combustion chamber 81 constructed substantially spherical and provided with a restricted opening 82 communicating with the engine cylinder, this opening 82 being preferably constructed off-center and as a result of this particular construction the air on being forced through the restricted opening is in general also caused to swirl in a vertical plane in the general direction as shown by arrow 83 in addition to the initial horizontal swirl. The fuel injection means 84 includes a nozzle 85 which is located in such a way as to inject the fuel substantially tangentially to the air swirl within the combustion chamber and in a direction opposite to the direction of the air swirl. The cylinder head is provided with an auxiliary air intake port 86 controlled by the sleeve valve means which are provided with an auxiliary air intake port 87 cooperating with the cylinder head intake port 86 and the cylinder intake port 88 for scavenging the combustion chamber in a manner as has been illustrated and described in connection with Figs. 1 and 2.

In Fig. 4 I have provided a cylinder head 90 having a combustion chamber 91 which is substantially cylindrical in shape and communicates with the cylinder through the restricted opening 92, said chamber and opening being preferably offset from the cylinder axis as shown in Fig. 5. The axis of this cylindrical combustion chamber is preferably positioned substantially at right angles to the cylinder and sleeve axes. It will be noted that the opening 92 is inclined to the horizontal plane extending transverse to the cylinder and sleeve axes in such a way as to permit the air which is swirling in the cylinder in a counter clock-wise position as viewed in Fig. 5 to be swept into the combustion chamber 91 with the least amount of resistance. This construction provides a swirling air mass within the combustion chamber 91 in the direction of arrow C (Fig. 4) and the fuel nozzle 92 is so constructed and arranged with respect to the combustion chamber 91 as to inject the fuel mixture substantially tangentially into the combustion chamber in a direction opposite to the air swirl. Similar means for scavenging the combustion chamber as illustrated and described in Figs. 1 to 3 inclusive are provided for the engine structure illustrated in Fig. 4, the cylinder head being provided with the auxiliary air intake port 93 controlled by the sleeve valve means having the auxiliary intake port 94 cooperating therewith and with the cylinder intake passage 95.

In the structures described above it will be noted that the air introduced into the cylinder is initially caused to swirl and this air swirl is so controlled and directed relative to the direction of the fuel spray as to provide efficient engine operation, substantially uniform distribution and efficient combustion of the fuel. With the structures herein illustrated greater fuel economy may be obtained and the air swirl is employed advantageously for providing a more efficient atomization and distribution of the fuel when injected into the combustion chamber thereby promoting quick and rapid combustion with the result that relatively greater power at higher speeds may be obtained from an engine of this type as compared with the usual poppet valve type of compression ignition or fuel injection engine in which no air swirl is usually imparted.

It will be apparent to those skilled in the art to which my invention pertains that various modifications and changes may be made therein without departing from the spirit of my invention or from the scope of the appended claims.

What I claim as my invention is:

1. In an engine of the compression ignition type having a cylinder ported for air intake, sleeve valve means controlling said port, a cylinder head having a combustion chamber provided with a restricted opening communicating with the cylinder, said combustion chamber having an auxiliary scavenging air intake port, said sleeve valve means also controlling said last mentioned port and timed with the engine operation to open said scavenging port after the combustion period and prior to the suction period through said other air intake, and fuel injection means including a nozzle for spraying fuel into said combustion chamber.

2. In an engine of the fuel injection type having a cylinder ported for an air intake, sleeve valve means controlling said port, a piston associated therewith, and a cylinder head provided with a cylindrical combustion chamber having an axis extending substantially at right angles to the engine cylinder axis, said chamber having a restricted opening communicating with the engine cylinder, and means injecting fuel into said combustion chamber.

3. In an engine of the fuel injection type having a cylinder ported for air intake and exhaust of the products of combustion, sleeve valve means controlling said ports and acting to induce the air to swirl in the cylinder, a piston associated therewith, a cylinder head provided with a cylindrical combustion chamber having an axis extending substantially at right angles to the cylinder axis, said combustion chamber having an opening communicating with the engine cylinder, said chamber and opening being offset with respect to the cylinder axis, whereby to position said opening in the path of air swirling in the cylinder with substantially the greatest velocity and to facilitate the flow of air from the cylinder to the combustion chamber with a substantial minimum change of direction, and means injecting fuel into said combustion chamber.

4. In an engine of the fuel injection type having a cylinder ported for air intake and exhaust of the products of combustion, sleeve valve means for controlling said intake and exhaust ports, a cylinder head for closing the outer open end of the cylinder and having a re-entrant head portion depending within the cylinder, said head position having a clearance with the cylinder wall whereby to form a sleeve pocket for accommodating the outer portion of the sleeve valve means, said head provided with a combustion chamber communicating with the cylinder, said air intake port communicating with the cylinder inwardly of the said re-entrant head portion, said re-entrant head portion having an auxiliary air intake port connecting the sleeve pocket with said combustion chamber, said cylinder including means connecting the air intake with the sleeve pocket adjacent to the overlying air intake port, said sleeve valve means also controlling said auxiliary air intake port and operating to admit air into the combustion chamber after combustion therein for sweeping the burned gases from said combustion chamber.

5. In an engine of the fuel injection type having a cylinder ported for air intake and exhaust of the products of combustion, sleeve valve means for controlling said intake and exhaust ports, a cylinder head for closing the outer open end of the cylinder and having a re-entrant head portion depending within the cylinder, said head portion having a clearance with the cylinder wall whereby to form a sleeve pocket for accommodating the outer portion of the sleeve valve means, said head provided with a combustion chamber communicating with the cylinder, said air intake port communicating with the cylinder inwardly of the said re-entrant head portion, said re-entrant head portion having an auxiliary air intake port connecting the sleeve pocket with said combustion chamber, said cylinder including means connecting the air intake with the sleeve pocket adjacent to the overlying air intake port, said sleeve valve means having an auxiliary port cooperating with the auxiliary air intake of said cylinder head, whereby to admit air direct into the combustion chamber after combustion therein to sweep the burned gases therefrom.

EDWARD T. VINCENT.